UNITED STATES PATENT OFFICE.

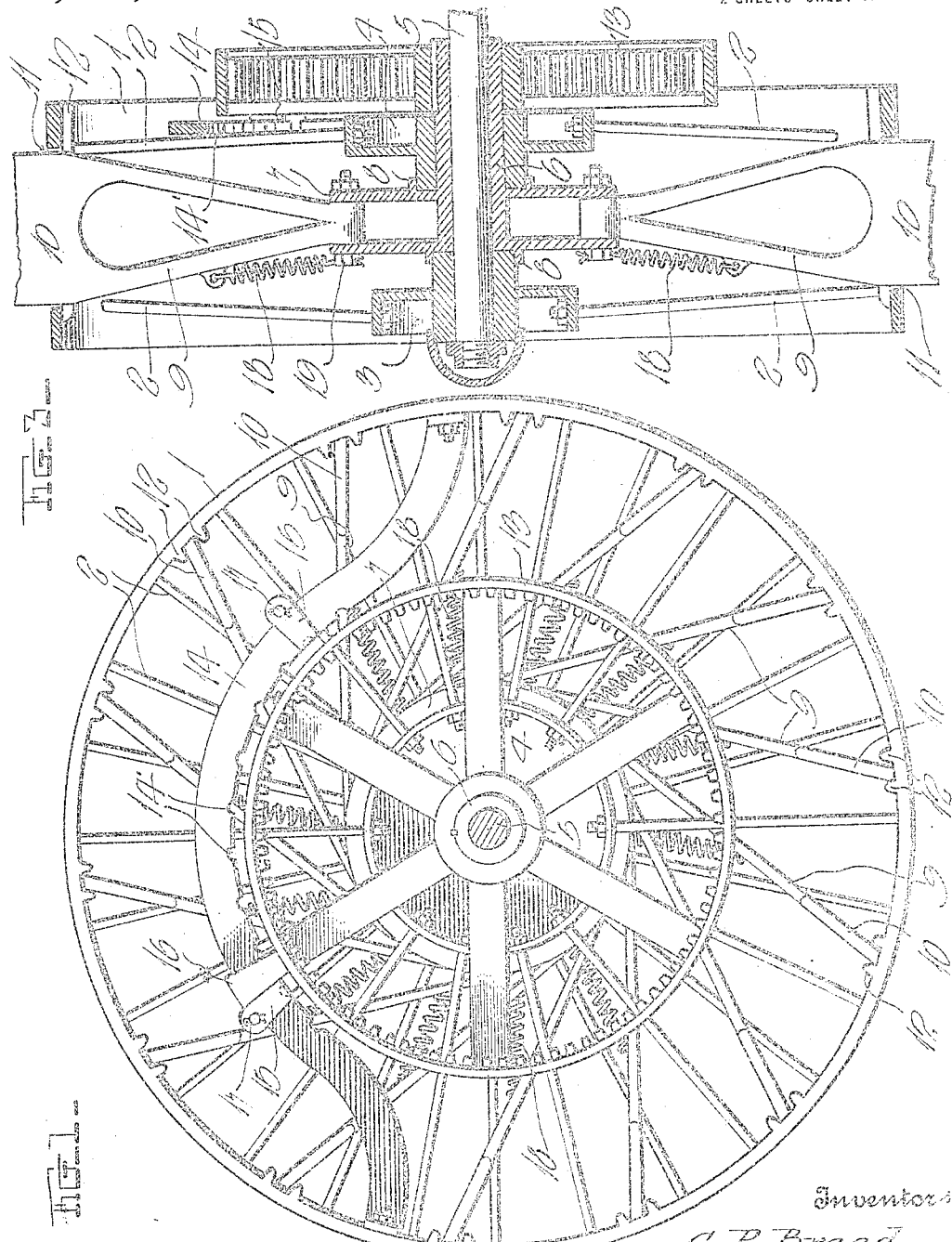

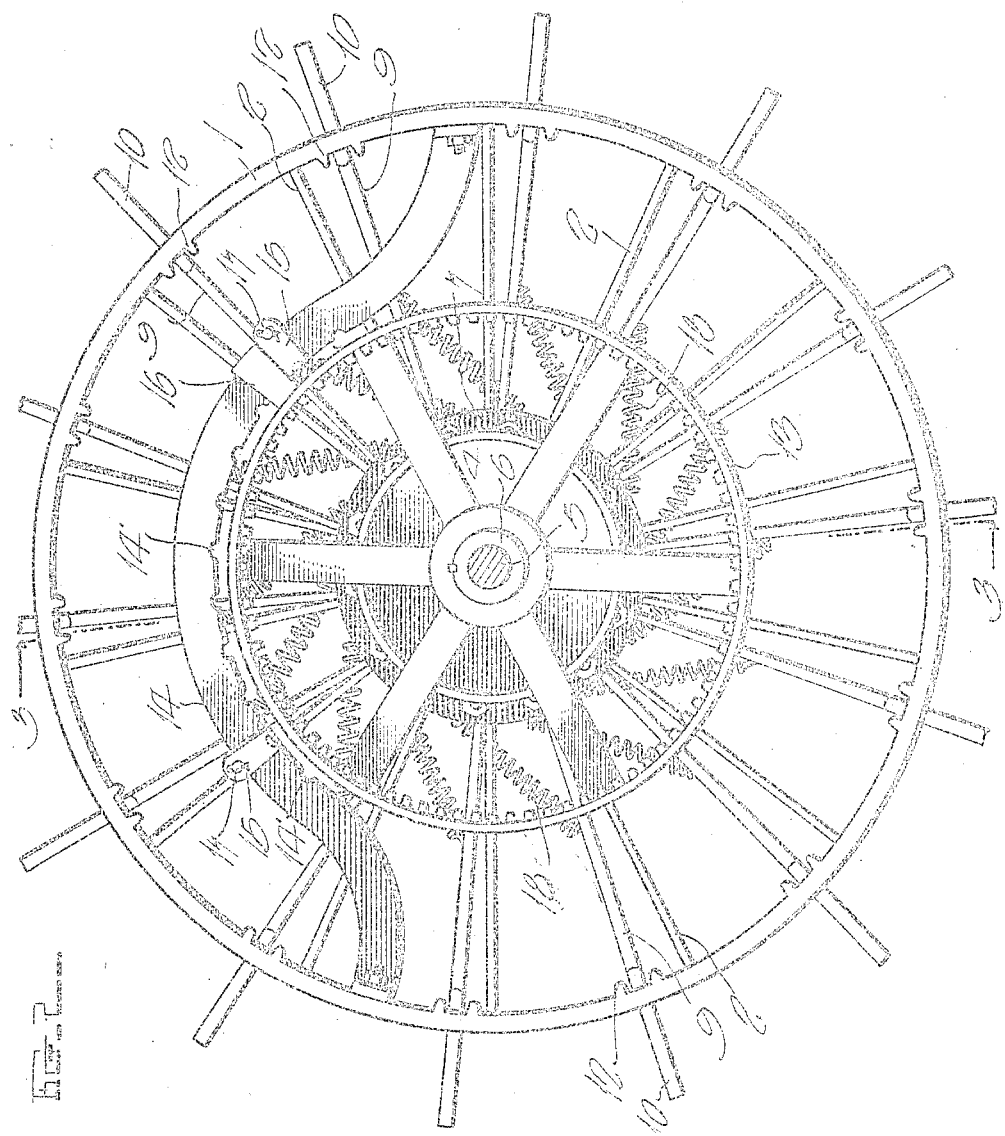

GEORGE P. BREED, OF WHITEHALL, AND EDD L. HAWN, OF RUBY, WISCONSIN; SAID HAWN ASSIGNOR TO SAID BREED.

TRACTION-WHEEL.

1,282,674.

Specification of Letters Patent.

Patented Oct. 22, 1918.

Application filed June 25, 1917. Serial No. 176,839.

*To all whom it may concern:*

Be it known that we, GEORGE P. BREED, a citizen of the United States, residing at Whitehall, in the county of Trempealeau and State of Wisconsin, and EDD L. HAWN, a citizen of the United States, residing at Ruby, in the county of Chippewa and State of Wisconsin, have invented certain new and useful Improvements in Traction-Wheels; and we do declare the following to be a full, clear, and exact description of the invention, such as will enable others skilled in the art to which it appertains to make and use the same.

Our invention has for its principal object to provide a simply constructed and inexpensive traction wheel having a plurality of lugs or calks which will be automatically projected beyond the periphery of the wheel as occasion may demand.

A further object is to provide a novel means for limiting the projection of the lugs or for totally preventing projection thereof when required.

With the foregoing general objects in view, the invention resides in the novel features of construction and unique combinations of parts, to be hereinafter fully described and claimed, the descriptive matter being supplemented by the accompanying drawings which form a part of this specification and in which:

Figure 1 is a side elevation of the improved wheel showing the position of parts when traveling on a comparatively hard surface;

Fig. 2 is a similar view with some of the spokes omitted for the sake of clearness and disclosing the manner in which the mud lugs are projected when the wheel is traveling in soft earth or the like; and, Fig. 3 is a sectional view on the plane of the line 3—3 of Fig. 2.

In the drawings above briefly described, the numeral 1 designates the tire of the improved wheel, said tire being carried by suitable spokes 2, anchored at their inner ends to hub sections 3 and 4 respectively. The section 3 is rotatably mounted on a suitable axle 5 whereas the section 4 is similarly mounted on a sleeve 6 which rotatably surrounds said axle, said sleeve having a pair of spaced disks 7 formed integrally with its inner end. Annular flanges 8 are by preference formed on the outer faces of the disks 7 to receive therein the inner ends of the hub sections 3 and 4.

Suitably constructed arms 9 are pivoted at one end between the disks 7 whereas the other ends of said arms are equipped with suitable mud lugs or calks 10 passing slidably through transverse slots 11 in the tire 1, said tire being by preference reinforced on opposite sides of said slots by transverse rods 12. The arms 9 extend from the hub toward the tire on lines tangential to the edges of the disks 7 and it will thus be obvious that when said disks are rotated in the proper direction, the arms will move to radial positions and will thus slide the lugs 10 outwardly through the slots 11. This action takes place automatically whenever it is desirable that the lugs be projected for engagement with the earth, as will be hereinafter more fully described.

A driving wheel 13 of any suitable type such as the gear shown is keyed on the inner end of the sleeve 6 and is driven by any preferred means carried on the tractor frame not shown. By driving the wheel 13, the disks 7 exert a tendency to force the lugs 10 outwardly, but this is resisted more or less according to the nature of the roadway or the like over which the tractor is traveling. For instance, if a comparatively hard stretch of road is encountered, the contact of the lugs therewith will prevent projection of said lugs beyond the tire. On the other hand, should it be necessary to travel over a stretch of soft earth or mud, there will be little resistance to the projection of the lugs and consequently they will then be automatically extended for use. The amount of projection is limited by suitable means employed for restricting the movement of the driving wheel 13 in respect to the tractor wheel.

The means last referred to is preferably in the form shown most clearly in Figs. 1 and 2 of the drawings. A bar 14 is secured at its ends to the tire 1 at substantially opposite points, the central portion of said bar being of arcuate shape and positioned concentric with the wheel 13, said bar serving as a support for a pair of stops 15 between which a third stop 16 operates, said last named stop being formed integrally with or otherwise mounted on the wheel 13. This arrangement of stops will limit the rotation of wheel 13 and consequently will control the projection of the calks 10, since said stops are adjustable along the bar 14.

The stops 15 are preferably of U-shape, the cross bars of said stops being receivable in notches 14' in the inner edge of bar 14, whereas the arms of said stops straddle said bar and project beyond the outer edge thereof, suitable pins 17 being passed through the free ends of said arms to maintain the stops in adjusted position. This construction is preferable but it will be obvious that other arrangements of parts could well be employed for holding the stops in one position or another, as occasion may demand.

Although the wheel will operate to equal advantage if embodying only the parts so far described, coiled springs 18 are preferably employed to prevent rattling of the arms 9 and lugs 10, one end of said springs being connected to said arms, whereas the other ends thereof are secured to the disks 7, preferably by the pivot bolts 19 of the arms 9. These springs also resist the outward movement of the arms sufficiently to prevent projection of the calks when the use thereof is in reality unnecessary. Whenever it is essential that the calks shall not be projected, however, one of the stops 15 is so adjusted along the bar 14 as to prevent relative movement of the wheel 13 and the tractor wheel, whereupon the entire device must rotate bodily. The calks may be locked in any suitable adjusted position, also by suitably adjusting the stops 15.

From the foregoing, taken in connection with the accompanying drawings, it will be obvious that although the invention is of an extremely simple and inexpensive nature, it will be highly efficient and durable, and will fulfil a long felt need in the art. Since probably the best results are obtained by the specific construction shown, this construction constitutes the preferred form of the improved wheel, but we wish it understood that within the scope of the invention as claimed, numerous minor changes may be made without sacrificing the principal advantages. Furthermore, we wish it understood that the improved wheel may be used on all sorts of power driven machines.

We claim:—

1. The combination with a traction wheel, of normally retracted mud lugs therefor, a rotary member mounted on the wheel for projecting said lugs, a driving wheel carried by and rotatable independently of the tractor wheel, said driving wheel being operatively connected with said rotary member. a pair of stops on said tractor wheel, and an additional stop on said driving wheel operating between said pair of stops to limit the relative turning of the two wheels.

2. The combination with a traction wheel, of normally retracted mud lugs therefor, a rotary member mounted on the wheel for projecting said lugs, a driving wheel carried by and rotatable independently of the tractor wheel, said driving wheel being operatively connected with said rotary member, a pair of stops carried by the tractor wheel and adjustable toward and away from each other, and an additional stop on said driving wheel operating between said pair of stops to limit the relative turning of the two wheels.

3. The combination with a tractor wheel, of normally retracted mud lugs therefor, a rotary member mounted at the axis of the wheel for projecting said lugs, a driving wheel operatively connected with said member, an arcuate bar secured to the tractor wheel and having a pair of stops, and an additional stop on said driving wheel operating between said pair of stops.

In testimony whereof we have hereunto set our hands in the presence of two subscribing witnesses.

GEORGE P. BREED.
EDD L. HAWN.

Witnesses:
EMMA BEEDLE,
N. C. HURLBURT.